(No Model.)

M. HUTIN & M. LEBLANC.
ALTERNATING CURRENT MOTOR.

No. 571,478. Patented Nov. 17, 1896.

Witnesses
Jno. G. Hinkel
F. T. Chapman

Inventors,
Maurice Hutin,
Maurice Leblanc,
By Joseph Lyons
Attorney

UNITED STATES PATENT OFFICE.

MAURICE HUTIN AND MAURICE LEBLANC, OF PARIS, FRANCE, ASSIGNORS TO THE SOCIÉTÉ ANONYME POUR LA TRANSMISSION DE LA FORCE PAR L'ELECTRICITÉ, OF SAME PLACE.

ALTERNATING-CURRENT MOTOR.

SPECIFICATION forming part of Letters Patent No. 571,478, dated November 17, 1896.

Application filed May 25, 1895. Serial No. 550,676. (No model.) Patented in Belgium January 9, 1891, No. 93,385.

*To all whom it may concern:*

Be it known that we, MAURICE HUTIN and MAURICE LEBLANC, citizens of the Republic of France, and residents of Paris, in the Department of the Seine, in the Republic of France, have invented certain new and useful Improvements in Alternating-Current Motors, of which the following is a specification, and for which we have received Letters Patent of Belgium, No. 93,385, dated January 9, 1891.

Our invention has reference to improvements in alternating-current apparatus of the kind which require for their operation two or more alternating currents of the same period, but differing in phase from each other.

The invention is more particularly adapted, although not restricted to, alternating-current motors of the kind known as "two-phase" or "multiphase" motors, and is an improvement upon the invention set forth in our Letters Patent No. 536,032, granted on March 19, 1895. In the said Letters Patent we have shown the manner of obtaining from a single alternating current two or more alternating currents differing in phase by the use of condensers of suitable capacity; and our present invention has for its object to obtain the same result by the use of secondary batteries or polarization-cells, whereby a considerable saving in the expense of the apparatus is secured.

The invention is illustrated in the accompanying drawings, in which—

Figure 1:
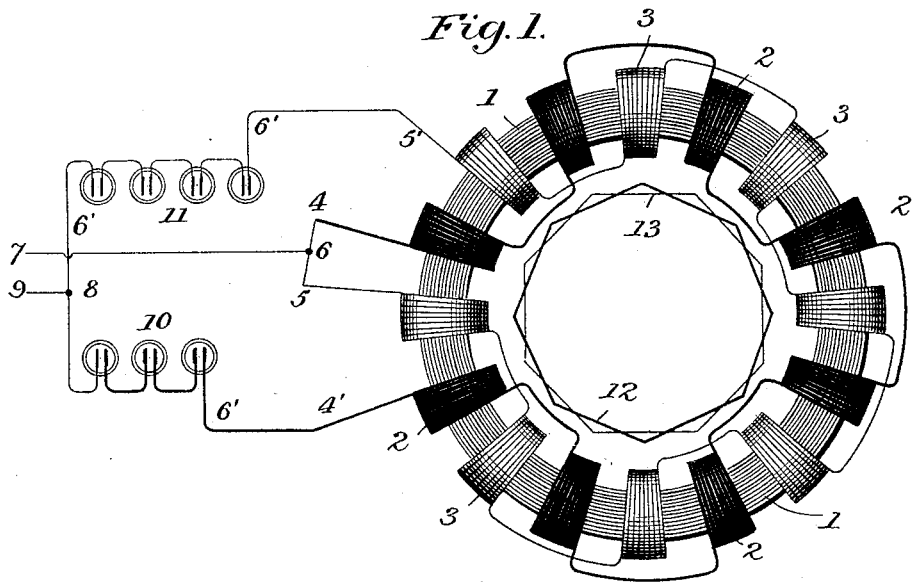
Figure 2:
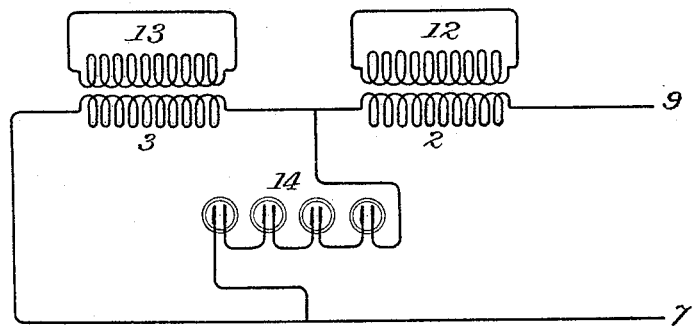
Figure 3:
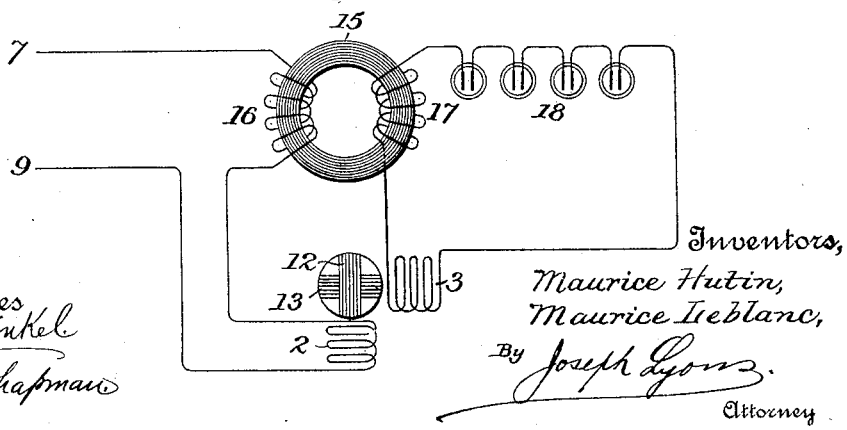

Figures 1, 2, and 3 are diagrams showing different modes of applying our invention to alternating-current motors.

The invention is based upon the fact that if a secondary battery receives only a slight charge its electromotive force is practically proportionate to the quanity of electricity which it receives. This is only true when the quantity of current received by the secondary battery is quite small, that is to say, the simple proportionality between the electromotive force of the secondary battery and the current received is only strictly true during an exceedingly short time after the beginning of the charge. It is therefore practically true for all alternating currents of the short periods universally used for the operation of alternating-current apparatus and especially of electric motors. We have found that, in consequence of this property of electrolytic cells or polarization-batteries, if they are included in a circuit charged with alternating currents and containing self-induction they tend to neutralize the electromotive force of self-induction, and if the number of such cells in series is sufficiently large the electromotive force of self-induction is completely neutralized. In addition thereto such cells or batteries tend to advance the phase of the alternating current in the circuit. This being the case, it is clear that if in two circuits charged with the same alternating current secondary batteries are inserted which differ from each other in the number of cells in series the currents in the two circuits may be dephased with reference to each other to any desired degree. This principle may be utilized for dephasing two currents of the same period in two independent circuits or two or more currents in two or more branches of the same main line carrying monophase currents, and it is for the latter purpose mainly that our invention finds its most practical application.

Referring now particularly to Fig. 1, the field-magnet of the motor there shown consists of a laminated ring-core 1 and two sets of coils 2 and 3, the coils of each set being connected in a continuous series and the alternate coils of each set being wound oppositely, as indicated in the drawings by the manner in which their ends are connected with each other. Moreover, the coils of the two series alternate, that is to say, between any two successive coils of one series there is a coil of the other series. In the drawings we have shown eight coils in each series; but any other even number of coils may be used.

One terminal 4 of the series of coils 2 is connected with one terminal 5 of the series of coils 3 by a bridge-wire 6, from which one of the line conductors 7 extends. The second terminal 4' of the series of coils 2 is connected with the second terminal 5' of the series of coils 3 by a bridge-wire 6′, from a point 8 of which extends the other line conductor 9. In this bridge-wire 6′ are inserted the batteries 10 11 of storage or polarization cells, one on each side of the point 8, where the line conductor 9 connects. These two secondary batteries have different numbers of cells connected in series, and in this instance it is assumed that the number of cells of the secondary battery 11 is greater than that of the secondary battery 10. If now an alternating current is conveyed to the field-magnet coils by the line conductors 7 9, and if we conceive the current as entering at 8, it will there divide into two branches, one branch comprising the secondary battery 10, the bridge-wire 6′, the terminal 4′, and the series of field-coil 2, the current passing by the terminal 4 to the bridge-wire 6 and returning by the line conductor 7 to the distant generator. The other branch will be by the bridge-wire 6′, secondary battery 11, terminal 5′, and the series of coils 3, from which the current emerges at the terminal 5, and then returns by the bridge-wire 6 and line conductor 7 to the distant generator.

By the secondary batteries 10 11 of unequal number of cells in series the currents in the two branches are dephased with reference to each other, their periods remaining unchanged, as hereinbefore explained. In the present case, where we have shown two field-branches, the difference of phase should be ninety degrees in order to produce a rotary field, as is well understood by those skilled in the art. If more than two sets of field-coils are used, the difference of phase required will be different, and in each case the number of cells in series in the secondary battery must be properly chosen with reference to the desired difference of phase and with reference to the self-induction, resistance, and static capacity of the branch. In this manner we produce a rotary field by alternating currents derived from a line carrying single-phase alternating currents, and it is of course immaterial how many reversely-wound coils there are in each set of field-coils, and in fact it is immaterial what the general construction and shape of the motor may be.

We prefer to use in our motor as many independent armature-windings, each closed upon itself, as there are sets of field-coils, and this is indicated in Fig. 1 by the two regular polygons 12 13, which, by their relative position, indicate that the two armature-windings are shifted with reference to each other in such manner that when the currents induced in one of the windings are at a minimum they are at a maximum in the other circuit. In this manner continuously-rotating polar lines are generated by the two armature-circuits, rendering the action of the motor practically constant from moment to moment instead of variable from moment to moment, as is the case when only a single armature-circuit is used.

It is not absolutely necessary to place a secondary battery in each of the branches the currents of which are to be dephased, since in many cases a single secondary battery is sufficient, especially in the case of two branches, to produce the required difference of phase. Fig. 2 represents one of these cases, in which the two sets of field-magnet coils 2 3 are represented as connected in series, and a secondary battery 14 is in shunt around one of these field-magnet coils and in series with the other. In this case the armature-circuits 13 are only roughly indicated. By properly choosing the number of cells of the secondary battery the currents in the two sets of field-magnet coils may be dephased with reference to each other by ninety degrees.

It is also practicable and in some cases preferable to place the two sets of field-coils in circuits which are inductively related to each other in such manner that one of the circuits is charged by the other through the intermediary of a converter, and in such case a secondary battery will be used only in the secondary circuit. This is represented in diagram in Fig. 3, where 15 represents a converter, the primary coil 16 of which is charged by the line 7 9, in which is also included the set of field-magnet coils 2, while the circuit of the secondary coil 17 includes another set of field-magnet coils 3 and a secondary battery 18. The armature-circuits closed upon themselves are indicated at 12 13. It is well known that in a converter the secondary currents lag behind the primary currents by one-half a period or less; but in this case the presence of the secondary battery in the secondary circuit will advance the normal phase of the secondary currents by one quadrant, so that there will be in the two field-circuits a difference of phase of one quadrant.

We have herein shown and described, by way of example, three different modes of utilizing our invention, but it will be clear to those skilled in the art that these examples might be multiplied and that the invention is applicable to an almost unlimited variety of alternating-current motors and other translating devices. In fact, wherever there is a circuit possessing self-induction, charged with alternating currents, a polarization-cell or a series of polarization-cells placed in the circuit will be useful for neutralizing the self-induction in part or in whole. The small cost of a polarization-battery and the ease with which its electromotive force of polarization is increased and diminished to any desired extent, by the simple addition or subtraction of cells, is a feature of great superiority over condensers.

Having now fully described our invention, we claim and desire to secure by Letters Patent—

1. The combination, with an electric circuit possessing self-induction, charged with alternating currents, of an electrolytic polarization-battery having a sufficient number of cells in series to neutralize by polarization the electromotive force of the self-induction in the circuit, substantially as described.

2. The combination, with an alternating-current motor, and in series with a circuit or circuits of the same, of an electrolytic polarization-battery adapted to yield an electromotive force opposed to that of the self-induction of the said circuit or circuits, substantially as described.

3. The combination of a feeding-circuit carrying monophase alternating currents, and a field-magnet, the coils of which are in parallel branches derived from the feeding-circuit; with a polarization battery or batteries for dephasing the currents in the branches with reference to each other, and thereby producing a rotary field, substantially as described.

4. A rotary-field alternating-current motor with two sets of field-magnet coils supplied from a source of simple alternating currents, and an electrolytic polarization battery or batteries connected up with the said field-magnet circuits, whereby the currents in the same are displaced in phase, substantially as described.

5. In an alternating-current motor, the combination of two sets of field-coils, each in a branch derived from a single-phase alternating-current circuit; with electrolytic polarization cells or batteries for unequally shifting the phases of currents in the branches and thereby producing a rotary field, substantially as described.

In testimony whereof we have signed our names to this specification in the presence of two subscribing witnesses.

MAURICE HUTIN.
MAURICE LEBLANC.

Witnesses:
CLYDE SHROPSHIRE,
PAUL BOUR.